Jan. 14, 1958 H. A. PATTERSON 2,819,656
METHOD AND APPARATUS FOR MAKING MOUNTS FOR DIAPOSITIVES
Filed Oct. 12, 1953 11 Sheets-Sheet 1
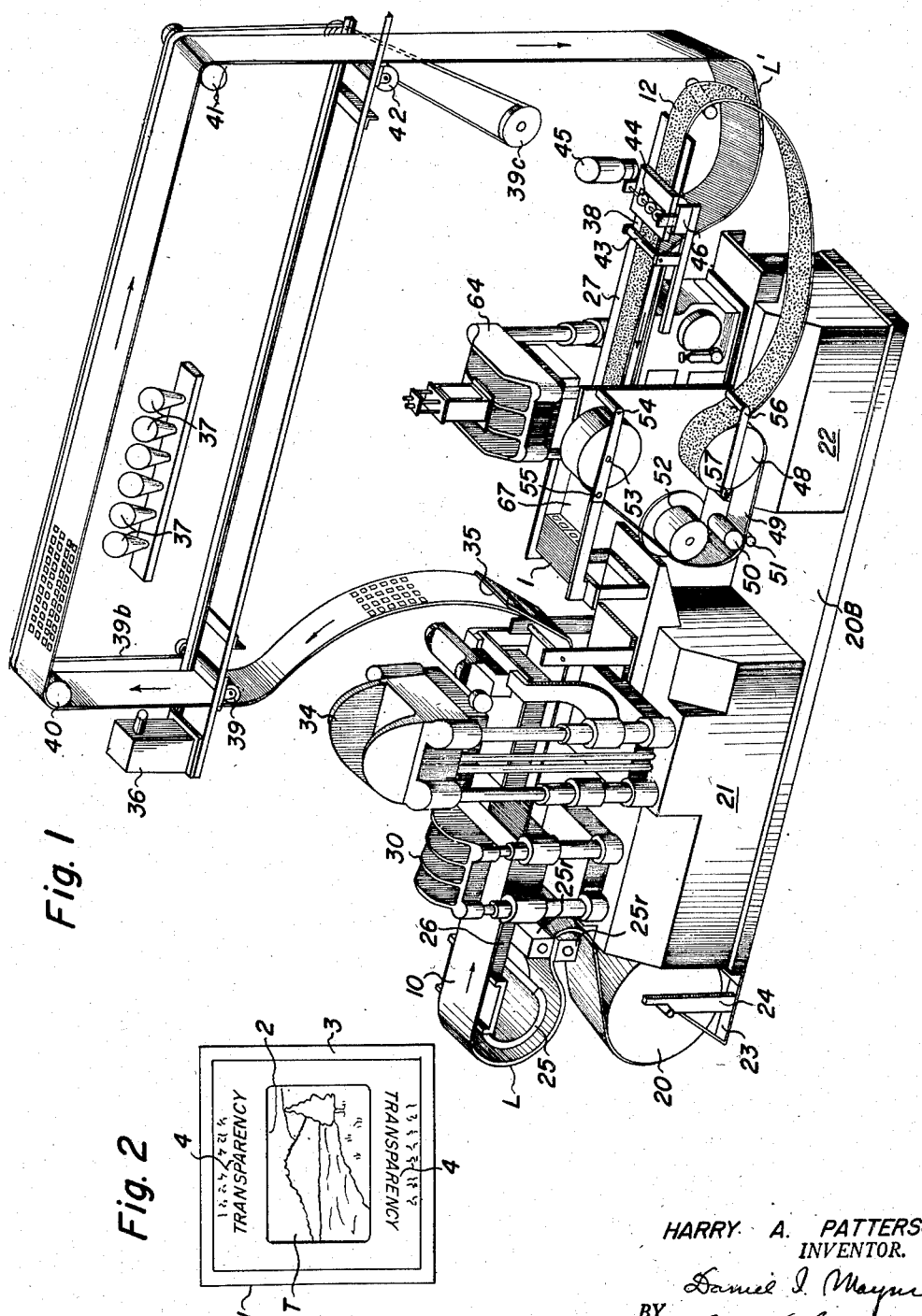
HARRY A. PATTERSON
INVENTOR.
BY
ATTORNEYS Jan. 14, 1958     H. A. PATTERSON     2,819,656
METHOD AND APPARATUS FOR MAKING MOUNTS FOR DIAPOSITIVES
Filed Oct. 12, 1953     11 Sheets-Sheet 2
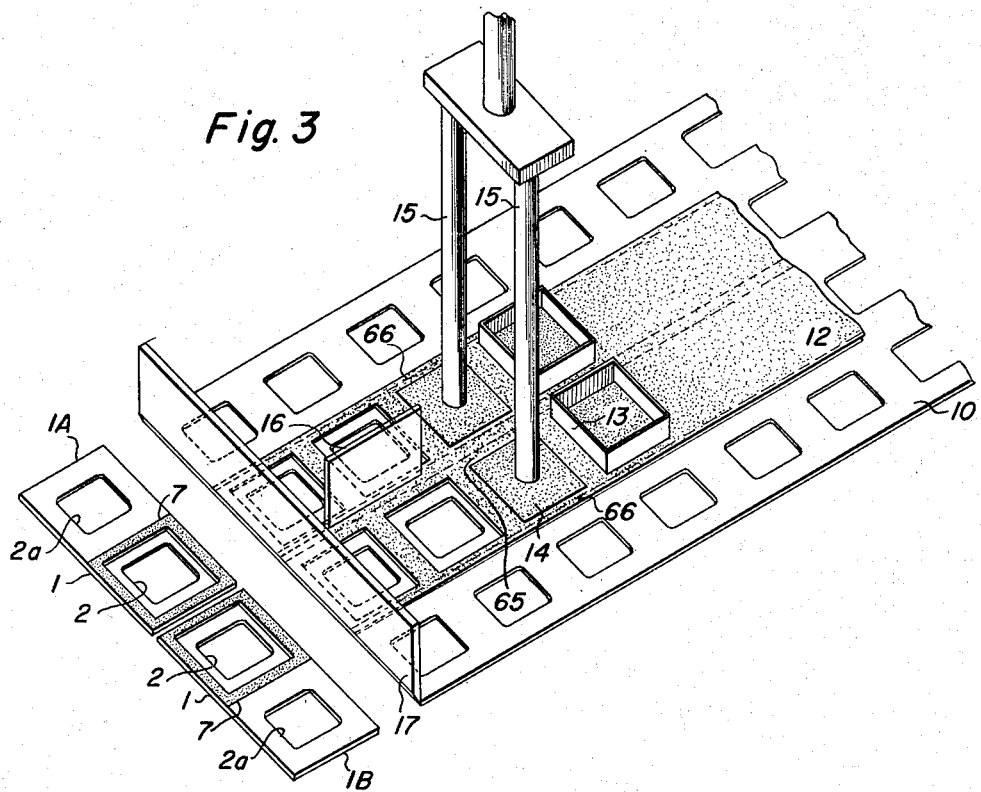
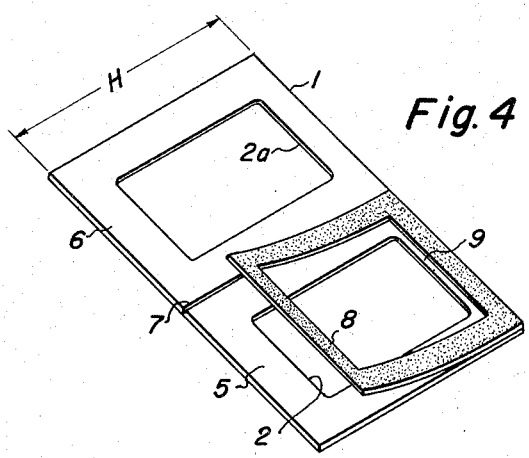
HARRY A. PATTERSON
INVENTOR.
BY
ATTORNEYS Jan. 14, 1958    H. A. PATTERSON    2,819,656
METHOD AND APPARATUS FOR MAKING MOUNTS FOR DIAPOSITIVES
Filed Oct. 12, 1953    11 Sheets-Sheet 4

HARRY A. PATTERSON
INVENTOR.

BY

ATTORNEYS

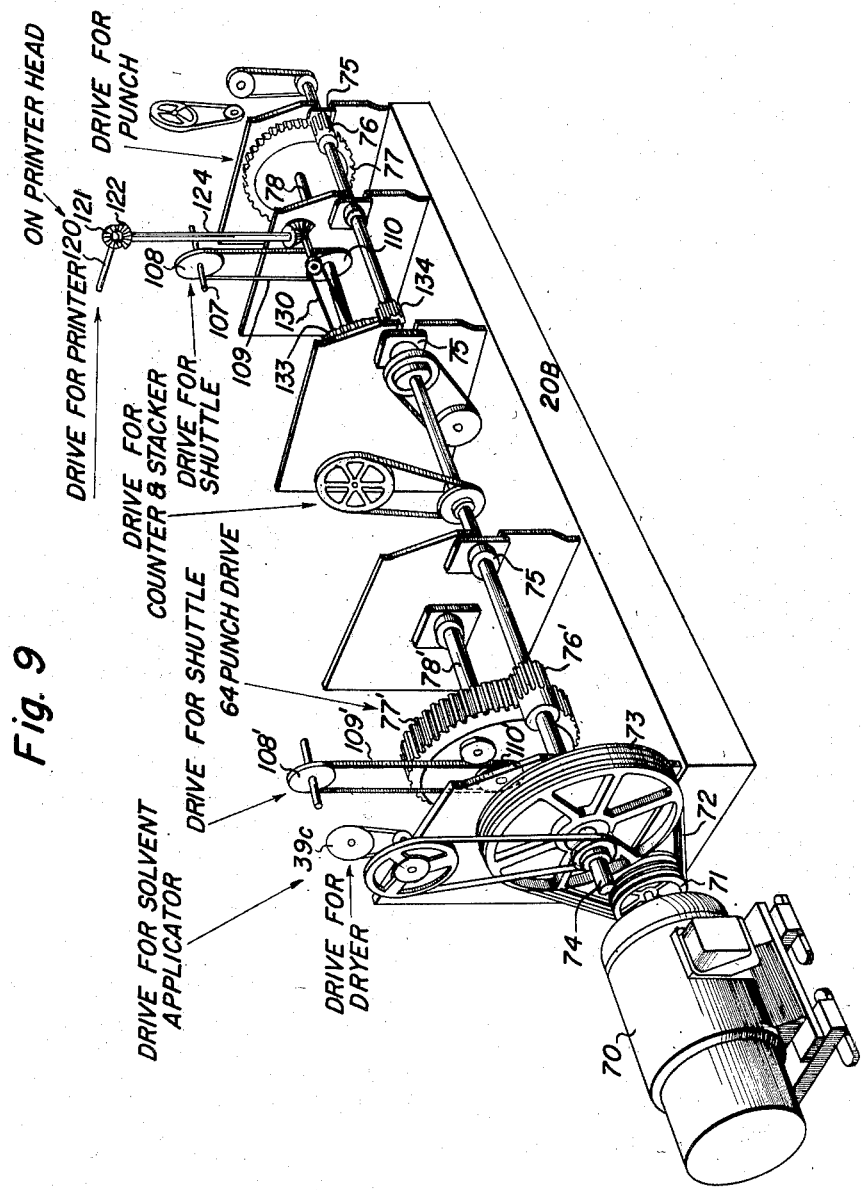

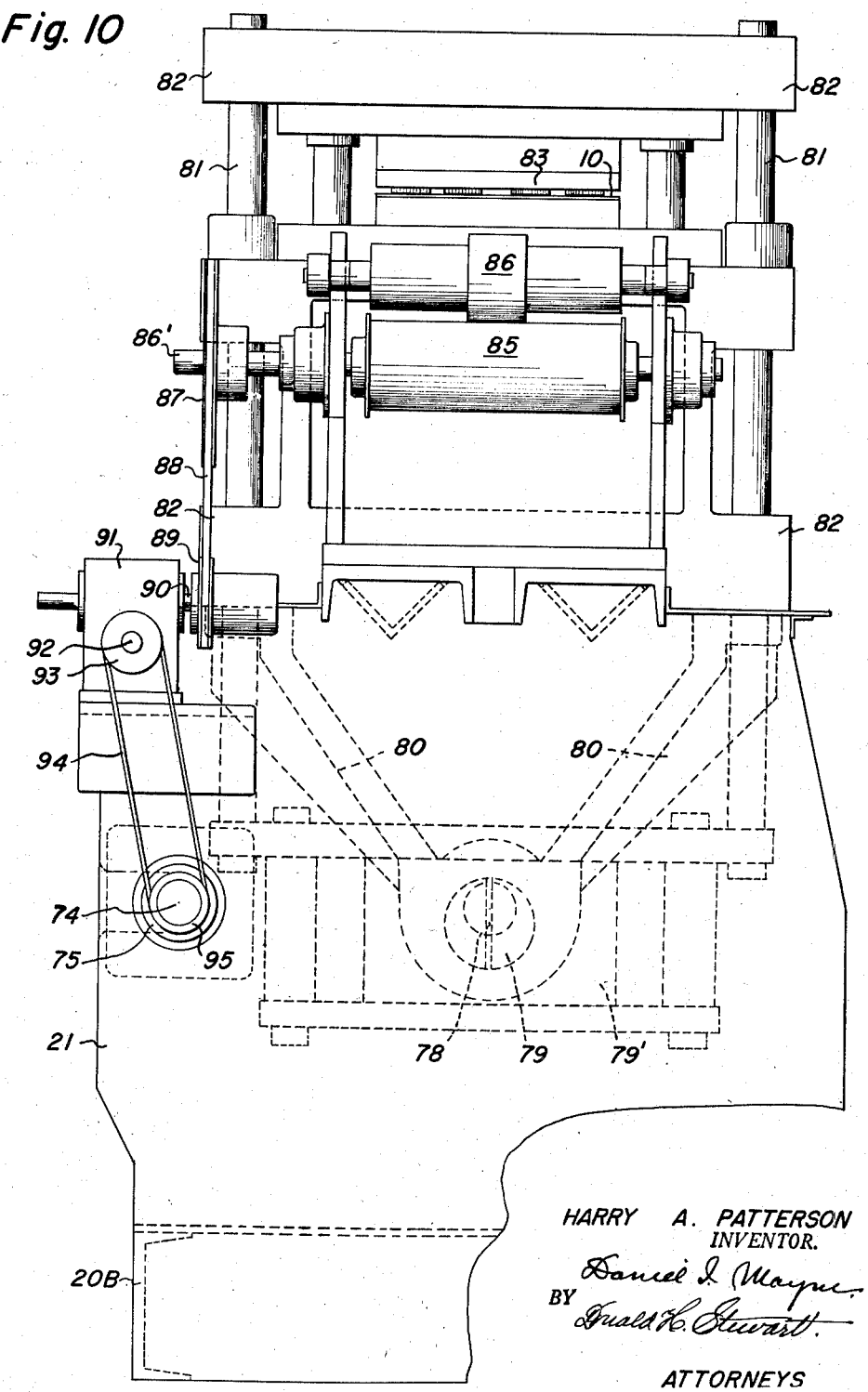

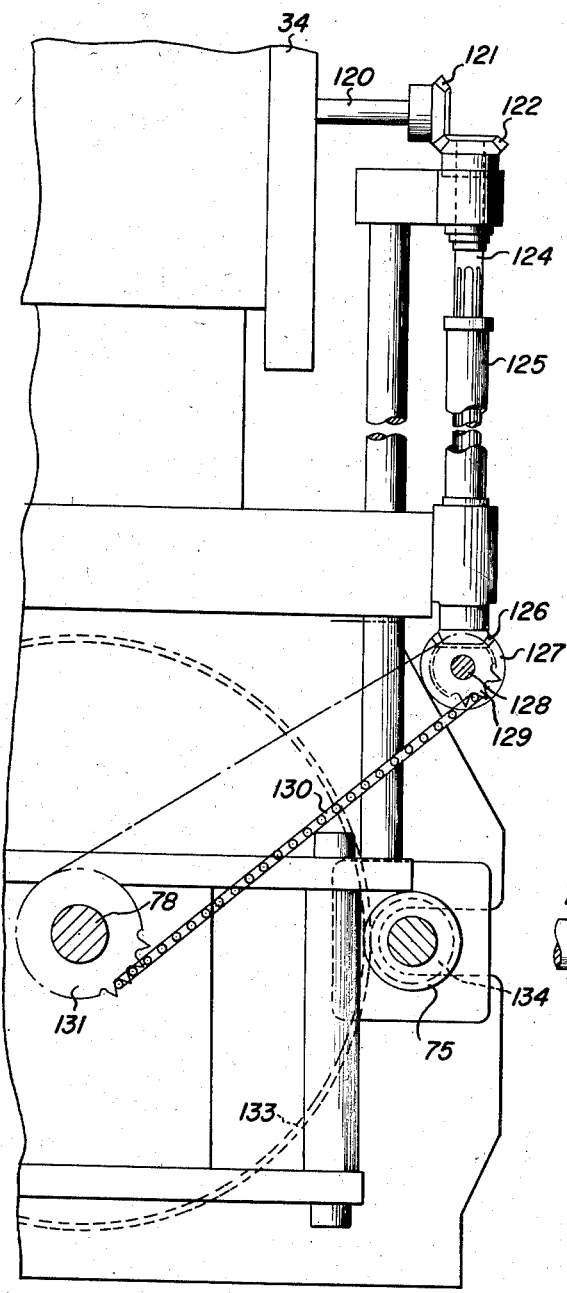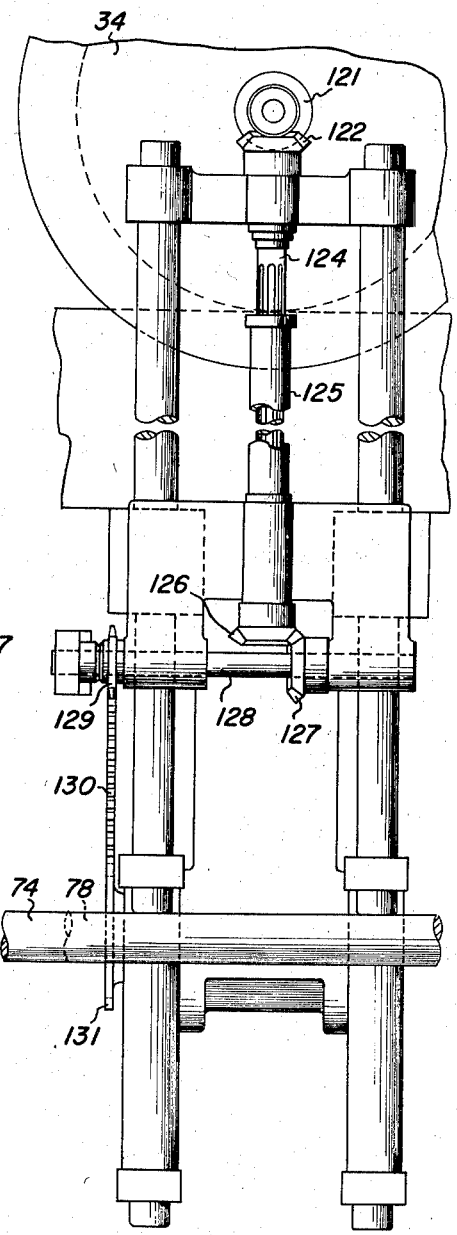

HARRY A. PATTERSON
INVENTOR.

BY

ATTORNEYS

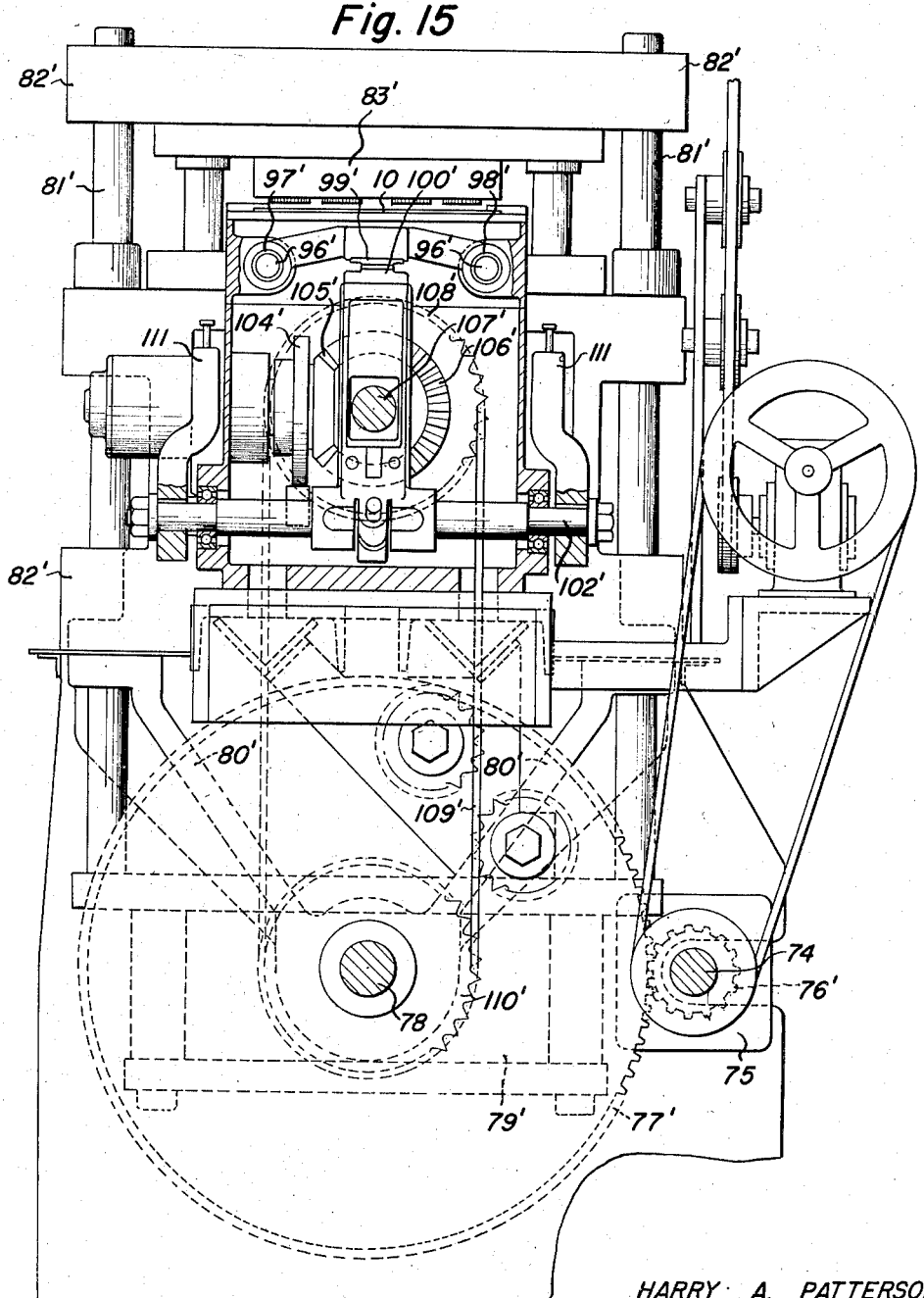

Jan. 14, 1958   H. A. PATTERSON   2,819,656
METHOD AND APPARATUS FOR MAKING MOUNTS FOR DIAPOSITIVES
Filed Oct. 12, 1953   11 Sheets-Sheet 10
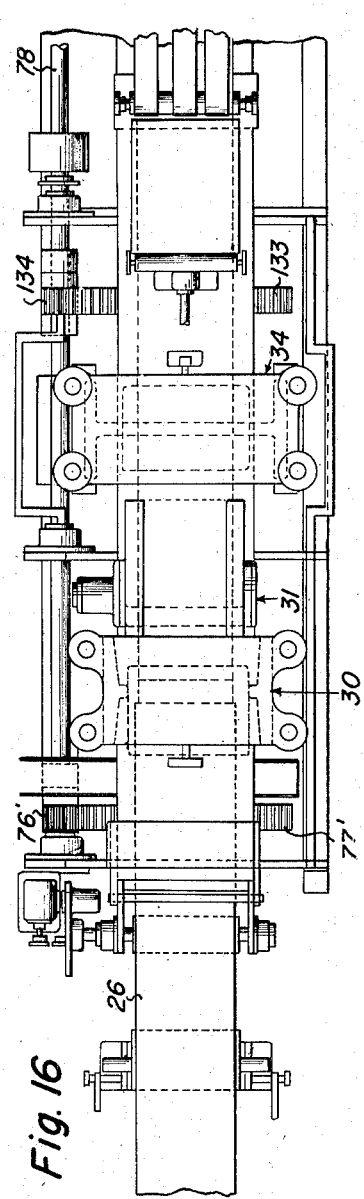
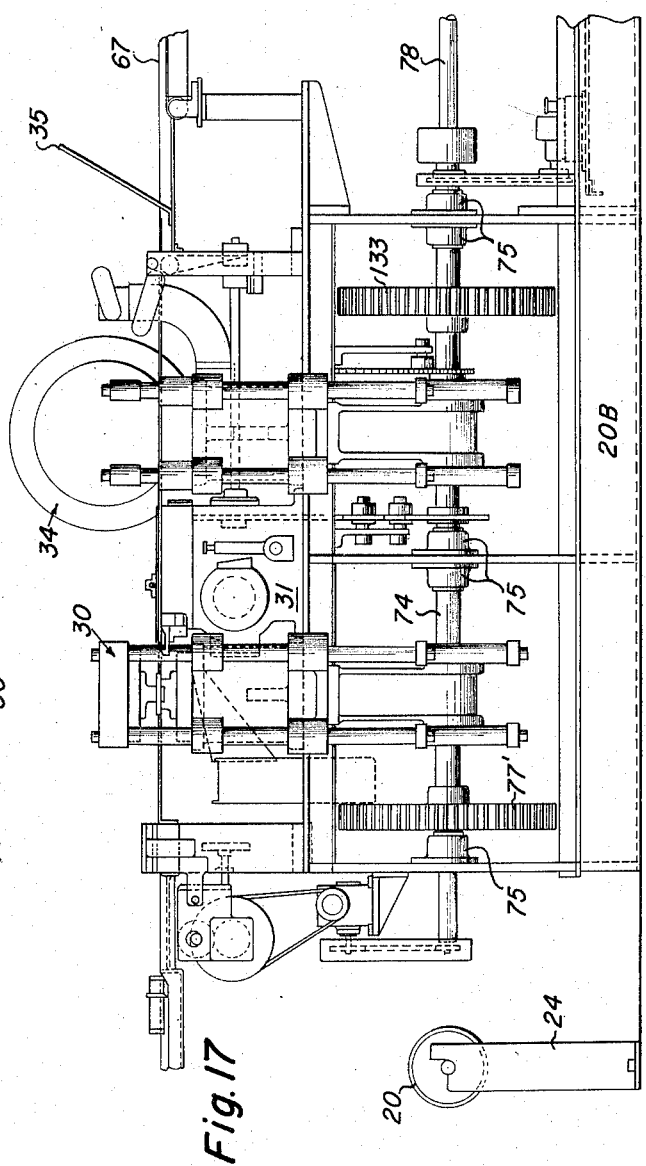
HARRY A. PATTERSON
INVENTOR.
BY
ATTORNEYS Jan. 14, 1958     H. A. PATTERSON     2,819,656
METHOD AND APPARATUS FOR MAKING MOUNTS FOR DIAPOSITIVES
Filed Oct. 12, 1953     11 Sheets-Sheet 11

HARRY A. PATTERSON
INVENTOR.

BY

ATTORNEYS

United States Patent Office 2,819,656
Patented Jan. 14, 1958

2,819,656

METHOD AND APPARATUS FOR MAKING MOUNTS FOR DIAPOSITIVES

Harry A. Patterson, Rochester, N. Y., assignor to Eastman Kodak Company, Rochester, N. Y., a corporation of New Jersey Application October 12, 1953, Serial No. 385,509

12 Claims. (Cl. 93—1)

This invention relates to mounts for slides to be used for projection purposes and particularly to a method of and apparatus for making such slide mounts inexpensively, accurately, and at a high rate of speed.

In projection slide mounts it has heretofore been difficult to make inexpensive cardboard or paper mounts which can be readily loaded with transparencies and which have accurately formed parts so that they may be folded into an operative position to hold transparencies between two frame members. These frames may be retained in an operative position by means of the application of heat and pressure. In such mounts there may be two outer joined frame members foldable along a weakened line to hold a transparency laid in a third frame member applied to the inner face of one of the outer frame members. All these frames must be extremely accurate to hold transparencies in an operative position in the frames to include all of the transparency possible in the frame and to exclude margins of the transparency which do not include parts of the picture-bearing area. If one frame fails to register with the other, more or less of the transparency is either covered by a part of the mount or an undesired portion of the transparency beyond the picture area may appear in the mount. Moreover, where such mounts are applied to transparencies after they are processed for little if any fee, they must be made at a very low cost.

One object of my invention is to provide a method of making transparency mounts in which the parts are formed, printed, and cut out at high speed while maintaining accurate dimensions and accurate registrations. Another object is to provide a method of making such mounts from cardboard or paper in such a manner that an exact similarity between the mounts may be obtained. Another object of my invention is to provide a machine for manufacturing slide mounts. Another object is to provide a machine for continuously turning out transparency mounts at high speed (such as 240 mounts per minute). Still another object is to provide a machine for continuously manufacturing such mounts from rolls of paper or cardboard stock, perforating, printing, drying, applying an adhesive frame, and cutting as the materials are assembled on the bed of a machine, with a minimum of attention from an operator. Other objects will appear from the following specification, the novel features being particularly pointed out in the claims at the end thereof.

In the drawings wherein like reference characters denote like parts throughout:

Fig. 1 is a somewhat schematic perspective view of a machine constructed in accordance with a preferred embodiment of my invention and adapted for use in carrying out my improved method;

Fig. 2 is a top plan view of a transparency mount with a transparency or diapositive mounted therein;

Fig. 3 is a diagrammatic view in perspective for illustrating certain steps in completing transparency mounts;

Fig. 4 is a perspective view of an unfolded transparency mount with the adhesively-coated kraft stock frame incompletely attached to the mount to better illustrate the invention;

Fig. 9 is a fragmentary perspective showing the unitary driving mechanism for the major parts of the machine;

Fig. 10 is a fragmentary view showing the die for punching the pairs of apertures in the stock;

Fig. 11 is a fragmentary end view showing the printing press and associated driving connection;

Fig. 12 is a side elevation of parts shown in Fig. 11;

Fig. 15 is a part end elevation and part section of the dinking die and dinking die shuttle and the associated drive therefor;

Fig. 16 is a top plan view of the machine shown in Fig. 1, showing the end at which the mounts are started, by punching and printing;

Fig. 17 is a side elevation of the parts of the machine shown in Fig. 16;

Figure 5:
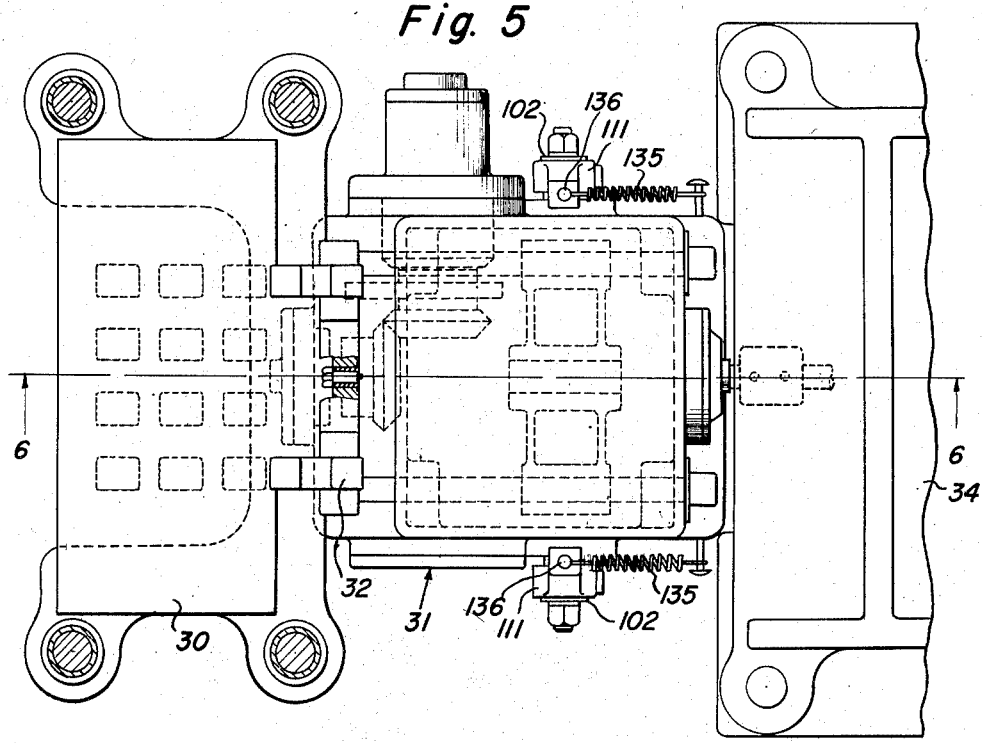
Fig. 5 is a fragmentary top plan view of a portion of the machine, parts of the punch and first shuttle being shown.

My invention comprises broadly a method and apparatus for drawing a base stock, such as jute stock, from a supply roll over a table and beneath a punch, an advancing mechanism acting on the cut-out apertures to register the stock beneath a printer. Resin-type ink may be used. The ink is preferably steamed, and the stock is dried by infrared light, after which the perforated stock is moved to the opposite end of the table. Here, a heat- and pressure-sensitive coated kraft paper is led over the table and onto jute stock where it is caused to adhere in stripes at areas which have been moistened by solvent rollers. The two materials advanced by the cut outs or perforations are led to a die which cuts through the adhesively-coated kraft paper and into but not through the jute stock. Any suitable adhesively-coated stock may be used—preferably a polyvinyl acetate coating, which may become tacky through the application of a solvent and by heat and pressure. After this operation, the died-out, adhesively-coated kraft part is removed, a reciprocating knife separates the strips of mounts into pairs, and a second cut-off knife cuts off the completed mounts. The heat and pressure-sensitive coating for the kraft paper may be of any suitable type such as a polyvinyl acetate.

All operations after the first perforations are controlled and registered by these perforations, the printing, punching of the coated kraft paper to form a frame, all include registration problems which are thus taken care of.

I prefer, although it is not necessary, to make the stock wide enough for one or more mounts to be produced side-by-side, thus making two or more cut outs at the first punching operation all in a row transversely of the stock.

I also prefer, although it is not necessary, to provide each mount with one cut out or frame slightly larger than the other so that, when folded, the masking will be done by one frame.

A typical mask made in accordance with my invention may consist, as shown in Fig. 2, of a lightweight cardboard or a heavy paper frame 1, such as of jute stock, having a masking opening 2 in the center. This may have a printed decorative border 3 and suitable printed wording 4 including a trademark, if desired, As shown in Fig. 4 in an unfolded position, the jute paper forming a frame has a front 5 and back 6 connected by a weakened fold line 7. An adhesive-coated frame 8 is here illustrated as being attached along two edges only but, when completed, this adhesively-coated paper adheres to the jute stock and lies flat upon it, leaving a recessed portion 9 into which a transparency such as a black-and-white or color film may be placed and accurately located with respect to the mount. The frames may then be folded on the weakened line and heat and pressure applied to seal the front 5 and back 6 together with the transparency T therebetween as shown in Fig. 2.

As diagrammatically illustrated in Figs. 3 and 4, my preferred method includes making two pairs of perforations 2 and 2a, perforations 2 being slightly smaller than perforations 2a, and all the perforations lying in a transverse line in the jute stock strip 10. Thus, there are two pairs of cut outs made at each movement of the first punch 30 before the stock 10 is printed and dried and reaches the right-hand end of the diagrammatic sketch, Fig. 3. From the right, adhesively-coated kraft stock 12 is applied to the jute stock 10 so that dinking dies 13 may punch through the adhesively-coated kraft stock 12, cutting through the latter but not the former, severing cut-outs 14. These may be removed by ejecting members 15. A knife 16 cuts the jute stock 10 and applied kraft stock 12 lengthwise and a transverse knife 17 chops the now split material into pairs of transparency frames 1. The stock moves intermittently, as will be later described. At each advance of the material, preferably two or more transparency frames are produced.

Fig. 1 shows a perspective somewhat schematic view of the entire machine, certain parts being omitted for clearness. As here shown, the machine consists of a base 20B, from which pedestals 21 and 22 extend upwardly. One end 23 carries a support 24 for a roll of jute stock 20 preferably slightly wider than the length of a pair of transparency frames 1. From the supports 24 this stock 20 may be led over a guiding and feeding mechanism 25 comprising a pair of rollers 25r, at least one of which is driven. This forms a loop L from which the strip 10 moves onto a table 26 which lies in a plane. A second table 27 is carried at the opposite end of the machine and preferably in the same plane.

The first operation is the punching operation to provide the row of apertures 2a, 2, 2, 2a, as diagrammatically illustrated in Fig. 3. Apertures 2 form the framing apertures and in the present instance apertures 2a the nonframing apertures. All these apertures are formed by a multiple punch, designated broadly as 30, which is intermittently operated from a source of power as will be described hereinafter. A known type of die head may be used, such as a No. 610 die head made by the Young Engineering Company of Chicago. This may be fitted with a multiple punch and may have a one-inch stroke.

Figure 6:
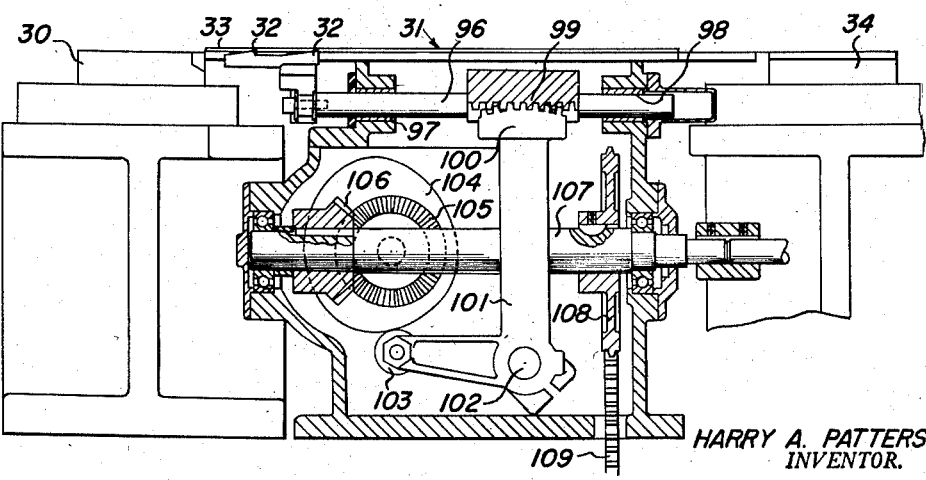
Fig. 6 is a section on line 6—6 of Fig. 5.

From the punch 30, the jute stock is advanced by a first shuttle shown in Figs. 5 and 6 and designated broadly as 31, this shuttle having a pair of reciprocating latches 32 which may engage either of two similar cut outs 2a, 2a or 2, 2. Here, apertures 2a, 2a are used. Thus, these reciprocating latches move the perforated stock 10 a distance equal to the amount H, Fig. 4, at each actuation. The card stock 10 being resilient and guided at the edges by flanges 33 causes the stock 10 to ride up and snap down over the latches 32 at each actuation. Thus, the stock 10 is advanced in accurate steps intermittently and rapidly.

The next operation is printing. The printer per se may be of a known type (such as Young Engineering Company, Chicago, No. 610 printing head with five-inch stroke) and is shown broadly at 34 in Fig. 1. This machine, when the jute stock 10 is intermittently at rest, moves down and prints the necessary or desirable imprint, such as shown in Fig. 2, the border 3, and the printing 4 or whatever data may be desired. This is preferably done with a resin-type of ink. The jute stock which has been punched and printed is led away from the table 26 at 35 up past a steamer 36 which sets the ink, then past a series of infrared lamps 37 to dry the jute stock, thence downwardly again with the inked side down to a position near the end 38 of table 27. Suitable guide and drive rolls 39, 40, 41 and 42 are connected to a belt 39b driven by a drive roll 39c, Figs. 9 and 1, and also position the loop L' of stock 10. Only the more essential guiding and driving means are shown, and the machine itself is somewhat schematically shown. The jute stock 10 passes under a roller 43, which roller is spaced from a plurality of narrow pressure rollers 44 which apply strips of solvent to the underside of an adhesively-coated kraft paper 12 by pressing it down against similar rollers, not shown, in this view, dipping into tank 46 fed by a solvent from the reservoir tank 45 through suitable connections.

The adhesively-coated kraft paper stock 12 is led over the extreme end of table 27 and moves toward the center of the machine. It is supplied from a roll 48 which may be interleaved with a strip of treated paper 49 to keep convolutions from sticking. The interleaving strip 49 is led away between guides 50, 51 and 52 and is rewound by winding on a hub 53 from which it may be removed by swinging guide 54 up about its hinge 55. A similar guide 56 may be swung up about pivot 57 to apply a new roll of adhesively-coated kraft stock 12.

Figure 7:
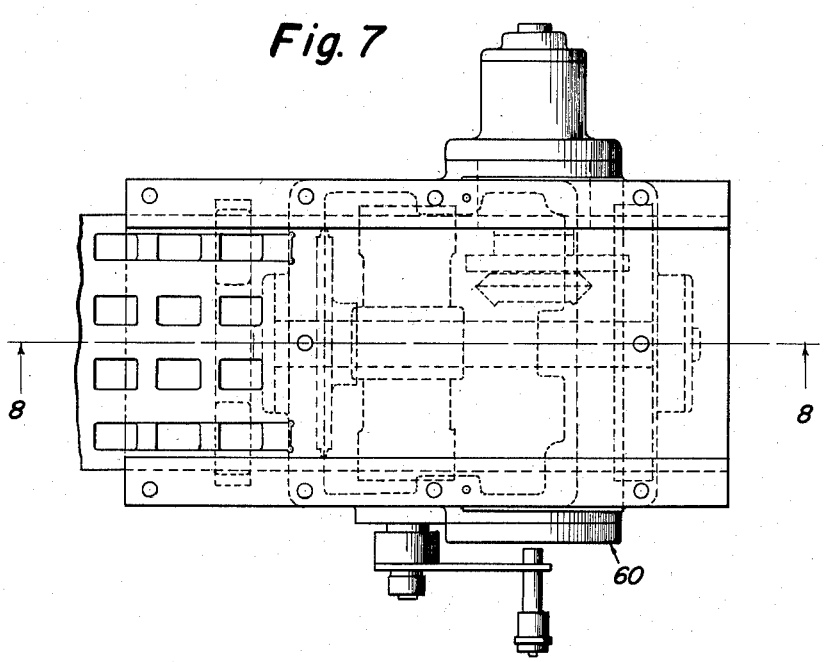
Fig. 7 is a view similar to Fig. 5 but of a second shuttle.

With the adhesively-coated stock 12 on the upper side of the jute stock 10 on the table end 27 and being attached thereto by stripes of adhesive coating diagrammatically indicated at 65, 66, Fig. 3, to which solvent was applied, this partially laminated stock is advanced step-by-step toward the center of the machine. This step-by-step movement is caused by a second shuttle assembly 60, Figs. 7 and 8, like assembly 31 except that the latches 61 move the perforated stock in an opposite direction and toward the center of the machine. Guides 62 hold the stock 10, 12 in position to snap down over the latches 61 which move the stock accurately the exact required distance at each reciprocation.

The combined stock 10, 12 is moved intermittently beneath a dinking die 13 operated by the punch mechanism shown broadly as 64, this mechanism being operated from the main power drive source to be later described. Any suitable punch mechanism may be used, such as a Young Engineering Company, Chicago, No. 610 die head having a one-inch stroke.

The dinking dies 13, Fig. 3, descend and pass through the adhesively-coated kraft stock 12 passing through this stock and severing rectangles 14 passing slightly into (but not through) the jute stock. These rectangles 14 are slightly larger than the size of the film to be mounted as a transparency and are removed as by an ejector, having rods 15 for pushing the waste material which has been died out through the cut outs. This can be done because the stripes of solvent are applied to the adhesively-coated stock 12 longitudinally and between the lateral edges of the cut outs 14, Fig. 3, and because around the dinking die there is a conventional type of holding pad which assists in holding the materials during the dieing and ejecting operations. These stripes of solvent producing the adhering areas between stocks 10 and 12 are partially indicated by the dotted areas 65 and 66 in Fig. 3, 66 being outer edge stripes and 65 a wider inner or central stripe.

After dieing out the rectangle 14 which leaves the transparency receiving frame or rabbet 9, the stock moves on, the two mounts 1A and 1B are cut apart by a reciprocating knife 16, after which a reciprocating chopper or cut-off knife 17 chops off the split-apart mounts 1A and 1B at periods of rest between the intermittent movements of the strip materials 10 and 12. After separation is complete, the mounts are preferably stacked and counted at the area 67 by a known type of apparatus which forms no part of the present invention.

The power drive 70, as shown in Fig. 9, is a motor, operating in this instance through pulley 71, V belts 72 and pulley 73 to drive a main horizontal drive shaft 74 which runs the length of the machine 20B and is supported by suitable bearings 75. This figure schematically shows the coaction of the various driving mechanisms. It is taken from the opposite side of the machine from that side shown in Fig. 1. Consequently, the perforator 30, the shuttle 31, the printer 34, the solvent moistener 44, the dinking die 64 and the stacker and counter at 67 are all arranged in reverse order from the showing of Fig. 1.

The punch position is indicated at 30. Shaft 74 carries a pinion 76 meshing with gear 77 which turns shaft 78. Referring to Fig. 10, a cam 79 turning with shaft 78 oscillates a block 79' sideways and up and down. This raises and lowers a frame 80 carrying posts 81 connected to cross heads 82, the upper of which carries the punch member 83 for punching out the frame apertures 2 and 2a in the roll stock 10.

Fig. 10 also shows a power-operated roll 85 cooperating with roll 86 for moving the jute stock 10 from roll 20, Fig. 1. Roll 85 is carried by shaft 86' carrying pulley 87 connected by a belt 88 to pulley 89. This pulley 89 is turned by shaft 90 of the gear reduction in housing 91 operated by shaft 92, pulley 93 and belt 94 from pulley 95 on the main drive shaft 74. Thus, the jute stock 10 is fed toward the punch 30 at the proper speed and into a loop L from which the stock 10 is advanced by the first shuttle 31 as above described.

Figure 8:
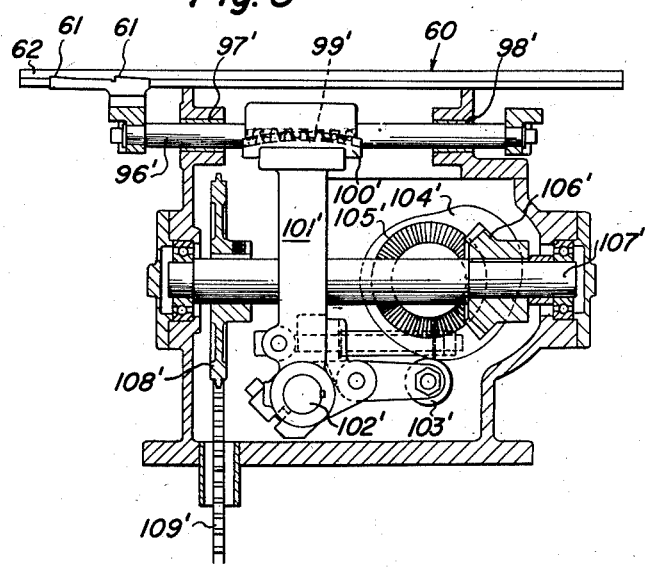
Fig. 8 is a section on line 8—8 of Fig. 7.
Figures 13, 14:
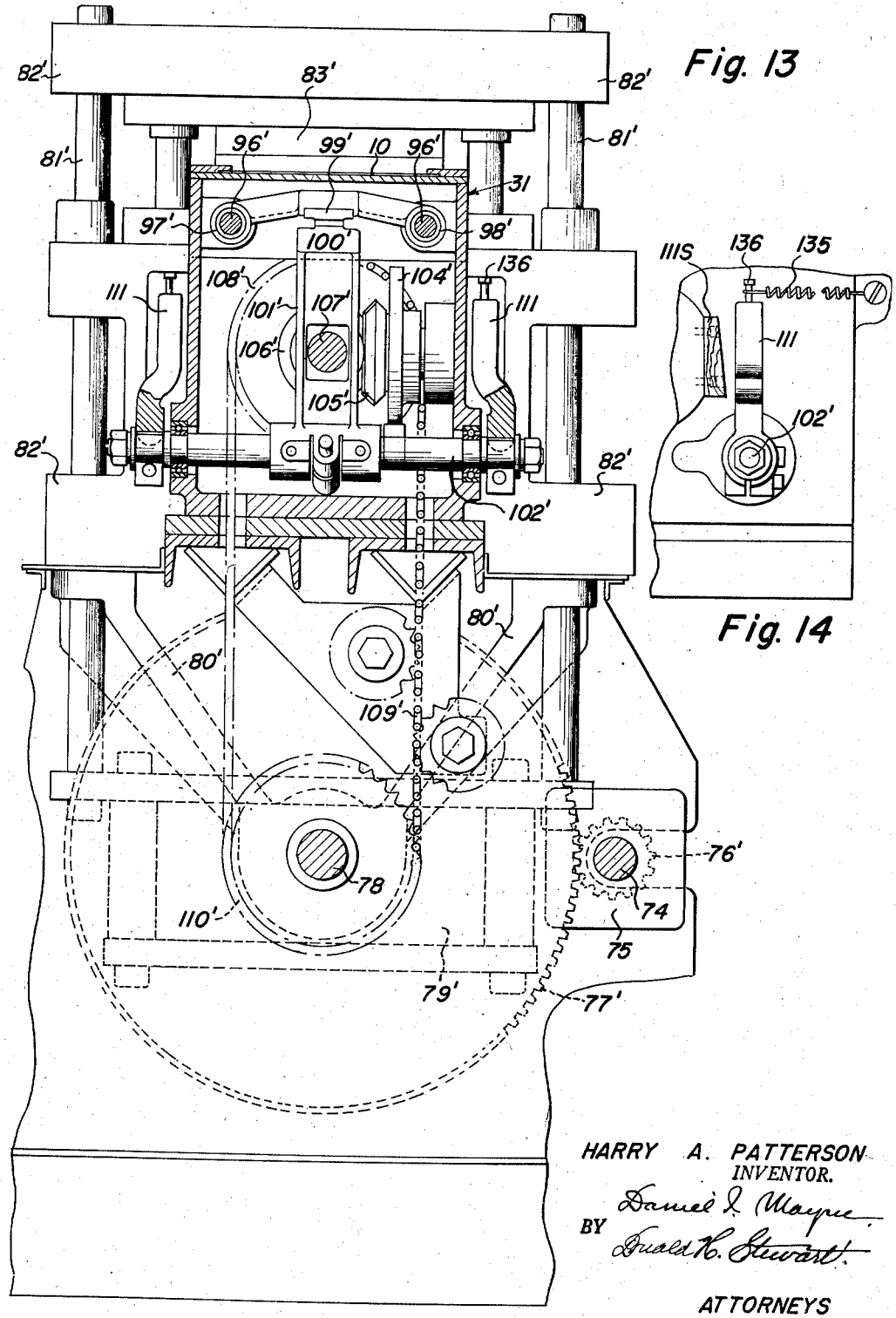
Fig. 13 is an end elevation of the punch and die shuttle.
Fig. 14 is a fragmentary side elevative detail showing the shuttle spring arm stop.
Figure 18:
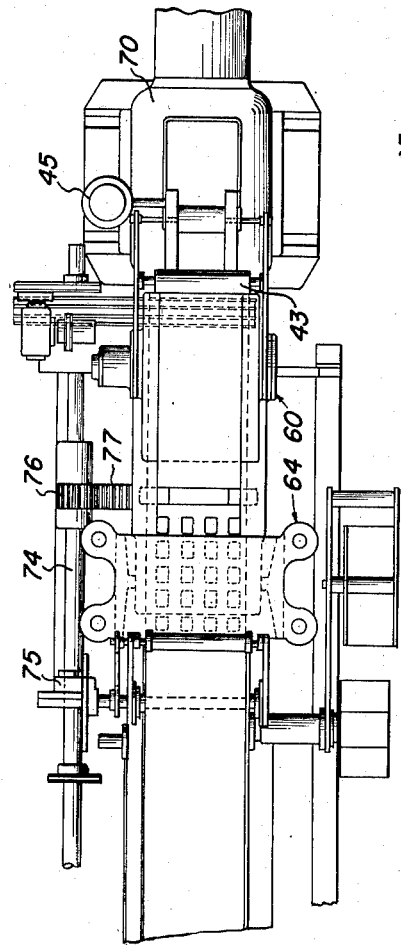
Fig. 18 is a top plan view of the opposite end of the machine from that shown in Fig. 16.
Figure 19:
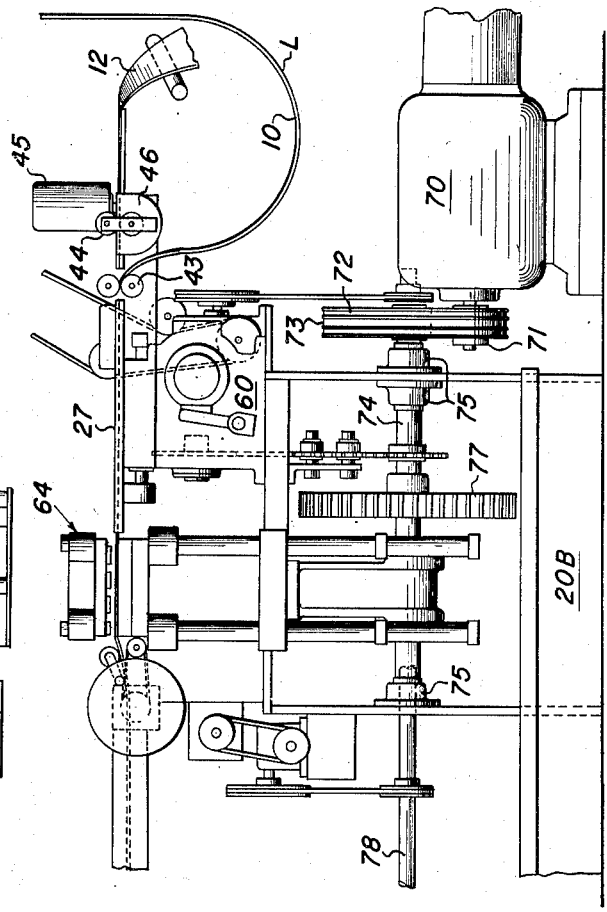
Fig. 19 is a fragmentary side elevation of the parts shown in Fig. 18.

As shown in Figs. 5 and 6, this assembly includes reciprocating latches 32 carried by two shafts 96 slidably supported in sets of bearings 97 and 98. Each shaft 96 includes a rack 99 which may be moved by gear segment 100 carried on a bell crank lever 101 pivoted on shaft 102 and carrying a roller 103 contacting a cam 104. This cam 104 is driven by bevel gears 105, 106 from shaft 107 to which sprocket 108 is attached to be driven by chain 109 from sprocket 110, Fig. 9. Shaft 102 carries levers 111. An arm stop 111S, as shown in Fig. 14 may be provided if desired. Springs 135, Figs. 5 and 6, tend to move levers 111 in a clockwise direction. These springs 135 are carried by the upper ends 136 of lever arms 111 carried by shaft 102 and tend to turn the shaft to hold roller 103 against cam 104. If desired, similar arms may be attached to each end of shaft 102, as shown in Fig. 5. Since the same operating mechanism is used for shuttle 61, the same reference characters primed are applied as shown in Fig. 8.

After being punched with cut outs 2 and 2a, the jute stock strip 10 is intermittently advanced by a pair of latches engaging these cut outs 2 or 2a. If cut outs 2 are smaller than cut outs 2a, the latches 32 of shuttle 31 may engage either pair of the same sized cut outs 2 or 2a to intermittently advance the strip 10 by an amount preferably H, Fig. 4, equal to the width of an unfolded mount. Thus, by using the shuttle, each advance of the strip 10 may accurately move a punched area in exact alinement with the printing machine 34 to print thereon, Fig. 2, the data 4 and the decorative border 3. Any such printing greatly disfigures the final transparency mount if not accurately located about cut out 2. If the cut out 2 is off-center or is improperly located with respect to the rabbet 9 in which transparency T may be positioned, the transparency will be improperly located. A high degree of accuracy of movement and registration is required to provide a satisfactory mount for transparencies.

The printing press 34 includes a shaft 120 carrying bevel gear 121, meshing with a similar gear 122 carried by shaft 124. This shaft has a telescoping and driving relationship with shaft 125 driven through bevel gears 126, 127 from a stub shaft 128. Shaft 128 is driven by sprocket 129, chain 130 and sprocket 131 from the shaft 78, gear 133, and pinion 134, the latter being carried by the main drive shaft 74. Thus, the printer 34 is intermittently operated in timed relation to the punch 30 as the stock is accurately advanced and positioned by the shuttle 31 through the accurately punched cut outs 2 or 2a, as the case may be.

The strip material 10, after punching, printing and drying, comes down from roller 42 and is reversed top for bottom. Thus, with the printed side down, it is moved over table section 27 in an opposite direction to the movement over table section 26 and toward the center of the table. With the stock so positioned, the adhesively-coated strip 12 is also moved in the same direction and is partially adhered to strip 10 being moved step-by-step by shuttle 60 moving in an opposite direction from the first shuttle 31.

The dinking dies, as shown in Fig. 13, may be operated by a known type of die head, such as the No. 610 die head made by the Young Engineering Company above referred to. Here, too, a one-inch stroke is desirable. The die head 83' is carried by cross head 82' by posts 81' sliding through suitable bearings as they are operated by mechanism similar to the perforator mechanism, the parts are given the same reference characters primed. The frame members 80' may be operated from mechanism exactly like the cam 79, sliding block 79' of Fig. 10, to secure the proper intermittent motion necessary to punch out the waste areas 14 shown in Fig. 3 from the stock 12.

After the dinking dies 13 punch out frames 8, knives 16 and 17 separate and chop off pairs of mounts which may be stacked and counted at 67 on the inner end of table 67. This stacking and counting operating forms no part of the present invention and is not shown.

It will be noted that strip materials in roll form, 10 and 12, are intermittently and accurately moved by synchronized shuttles to the various stations for punching, printing, drying, laminating, dieing and finally splitting and chopping, thereby avoiding handling. Accuracy may readily be obtained and from 200 to 300 mounts per minute can be produced with the illustrated embodiment. Thus, mounts can be readily made inexpensively and accurately with a minimum of handling.

The above specification, when taken with the drawings, fully discloses a preferred apparatus and method of producing cardboard or paper mounts for picture slides. Other embodiments may be readily suggested thereby, and I consider as within the scope of my invention all such forms as may come within the scope of the appended claims.

Having thus described my invention, what I claim is new and desire to secure by Letters Patent of the United States is:

1. The method of making transparency mounts continuously from rolls of strip paper comprising moving the paper from a roll to a punch and die for forming a transverse row of cut outs to form frames for a transparency, said frames having edges, intermittently moving the strip paper for printing in registration with the edges of the cut-out areas, moving the strip paper away from its horizontal path for drying, returning the strip paper to its horizontal path, reversing the strip paper from top to bottom so that the printed side may lie downwardly, again moving the strip paper by the edges of the cut outs but in the opposite direction, moving a strip of heat pressure adhesive coated material of less width than the width of the original strip material, applying bands of solvent to the heat pressure adhesive to cause narrow longitudinal bands of the pressure adhesive-coated material to adhere to the first-mentioned strip paper, said adhering bands lying outside the cut-out frames of the strip paper, cutting through the adhesive coated strip and into but not through the paper strip and removing the waste cut out, and finally longitudinally slitting and transversely chopping the combined strips into individual transparency mounts.

2. The method of making a series of transparency mounts, each comprising two frame members hingedly connected along one edge and one frame member carrying an attached transparency locating frame including a heat-sensitive adhesive, said method comprising providing a strip of material of a width to provide for more than one mount arranged transversely of the strip, dieing out two cut outs in each mount leaving edges on the strip of material extending transversely of the strip of material, moving the strip by a cut-out edge thereof area into registration with a printer, printing indicia about at least one cut-out area of each mount, drying the strip material, reversing the strip from top to bottom, applying a strip of heat pressure adhesive coated material over at least one cut out of each mount, causing said adhesive coated material to adhere outside of the cut-out areas only, cutting through said adhesive-coated strip and into but not through the cut-out strip about a cut-out area, removing the cut-out blank and separating the individual transparency mounts.

3. The method of making a series of transparency mounts as dfined in claim 2 in which the strip material is cut out with a plurality of laterally alined openings for a pair of transversely arranged transparency mounts and in which the separating of the individual transparency mounts comprises first slitting the strip longitudinally and then transversely.

4. The method of making a series of transparency mounts as defined in claim 2 characterized in that the strip is moved through a path in which the printed side of the cut-out strip material is turned upside down before the heat-sensitive layer is partially adhered over at least one cut-out area in each transparency mount.

5. A machine for continuously making transparency mounts, comprising in combination a base, a support for a first roll of paper, a cutting device for making a transverse row of cut outs across the sheet, a shuttle adapted to engage certain cut outs for moving the paper strip one step at a time in one direction, a printing mechanism operable in timed relation to the shuttle to print the strip material in a predetermined relation to the cut outs, means for drying the printed material and for guiding the strip to move in a reverse direction with the strip reversed from top to bottom, a second shuttle for moving the paper strip, means for guiding a second strip of paper coated with adhesive over the top of the first strip of paper and over at least some of the cut outs therein, an applicator for applying solvent to stripes between the cut outs to cause limited adherence between the first and second paper strips, a dinking die operable in timed relation to the second shuttle to cut areas from the second strip when the strips are at rest and positioned by the second shuttle, said dinking die being adjusted to stop before materially entering the first paper strip, mechanism for longitudinally slitting the two strips of paper, and a chopper operable in timed relation to the second shuttle for severing the individual transparency mounts while the material is at rest and positioned by the second shuttle.

6. A machine for continuously making transparency mounts, comprising in combination a base, a support for a first roll of paper, a cutting device for making a transverse row of cut outs across the sheet, a shuttle adapted to engage certain cut outs for moving the paper strip one step in one direction, a printing mechanism operable in timed relation to the shuttle to print the strip material in a predetermined relation to the cut outs, means for drying the printed paper and for guiding the strip to move in a reverse direction with the strip reversed from top to bottom, a second shuttle for moving the paper strip, means for guiding a second strip of paper coated with adhesive over the top of the first strip of paper and over at least some of the cut outs therein, an applicator for applying solvent to stripes between the cut outs to cause limited adherence between the first and second paper strips, a dinking die operable in timed relation to the second shuttle to cut areas from the second strip when the strips are at rest and positioned by the second shuttle, said dinking die being adjusted to stop before materially entering the first paper strip, mechanism for longitudinally slitting the two strips of paper, and a chopper operable in timed relation to the second shuttle for severing the individual transparency mounts while the material is at rest and positioned by the second shuttle, a main drive motor, a shaft connected to the punch, the first shuttle, the printer, the second shuttle, the dinking die and the chopper for operating these parts in synchronism.

7. A machine for continuously making transparency mounts, comprising in combination a base, a support for a first roll of paper, a cutting device for making a transverse row of cut outs across the roll of paper, two cut outs for each mount arranged crosswise of the strip of material, a first shuttle having at least one cut-out engaging member for moving said strip material by the cut outs a step at a time, a printing mechanism adjacent the first shuttle and operable in timed relation therewith for printing indicia on the strip, means for reversing the strip material from top to bottom, a feeding device for furnishing a strip of heat-sensitive adhesively-coated material to and pressing it in contact with the first strip of paper, means for applying stripes of solvent to the adhesively-coated material to cause it to locally adhere to the strip of paper, a second shuttle for moving the strip paper step-by-step, a dinking die adjacent the second shuttle and operable in timed relation therewith for cutting out unadhered areas of the adhesively-coated strip material about certain cut outs to provide a transparency receiving rabbet, and cutting mechanism for splitting and severing the completed mounts.

8. A machine for continuously making transparency mounts, comprising in combination a base, a support for a first roll of paper, a cutting device for making a transverse row of cut outs across the sheet, two cut outs for each final mount arranged crosswise of the strip of material, a first shuttle having at least one aperture-engaging member for moving said strip material by certain cut outs a step at a time, a printing mechanism adjacent the first shuttle and operable in timed relation therewith for printing indicia on the strip, means for reversing the strip material from top to bottom, a feeding device for furnishing a strip of heat-sensitive adhesively-coated material to and pressing it in contact with the first strip of paper, means for applying stripes of solvent to the adhesively-coated material to cause it to locally adhere to the strip of paper, a second shuttle for moving the strip of paper step-by-step, a dinking die adjacent the second shuttle and operable in timed relation therewith, said dinking die being adjusted to cut through the adhesively coated material and into the first-mentioned strip of paper a distance to completely sever a piece of the adhesively coated material without cutting through the first-mentioned strip, means for removing the severed piece of adhesively coated material to leave a transparency locating frame surrounding a perforated frame, a knife for slitting the strip of paper longitudinally, and a chopper for cutting off the individual transparency mounts, said chopper operating in timed relation to the second shuttle.

9. The method of making transparency mounts continuously from rolls of strip material comprising making transverse cutouts in the strip material defining frames of the final mounts, said frames having edges, intermittently moving the strip of material by an edge of the frames, accurately locating the strip by the moving means, printing the accurately located strip, reversing the strip material from top to bottom to locate the printed side down, treating longitudinal stripes of adhesively-coated material to render the stripes tacky, pressing the tacky areas of the adhesively-coated material against the first-mentioned strip material outside the cut-out areas therein, cutting through the adhesively-coated material but not through the first-mentioned strip material and removing the severed area leaving a transparency locating frame about a cut-out area, moving the strip material intermittently past a chopper to sever the frames while the strip material is at rest.

10. The method of making transparency mounts continuously from a roll of strip material comprising cutting out apertures in the strip material to define frames of the final mount, said frames having edges extending transversely of the strip in a row, moving the strip material intermittently by an edge of the cut-out punched frames, registering the strip material with a printer to print indicia thereon, drying the freshly printed material and reversing the direction of the material and turning the material over, applying stripes of solvent to an adhesively-coated material, applying said adhesively-coated material to the first-mentioned strip material by pressing the two together with the solvent coated stripes outside the cut-out areas to hold the adhesively-coated material to the cut-out material, cutting through the adhesively-coated material but not through the first-mentioned strip material to release rectangles of material larger than the cut-out areas of the first-mentioned strip material and surrounding the cut-out areas to form a transparency receiving rabbet, slitting the strip longitudinally, and finally chopping the individual mounts transversely from the strip material.

11. The method of continuously making more than one strip of transparency mounts from a roll of paper, each strip comprising two frame members connected along one edge, said method comprising intermittently moving the first paper strip through a path, successively punching pairs of apertures therein, applying a strip of adhesively-coated material having a heat-pressure-sensitive layer thereon over the first-mentioned paper strip, attaching the adhesive pressure-coated strip to the perforated strip by activating stripes of the heat-pressure-sensitive layer with a solvent, thereby rendering the solvent treated areas of the adhesive layer tacky, applying pressure to the adhesive-coated strip causing the tacky areas thereof to adhere to the first-mentioned paper strip, cutting through the heat-pressure-sensitive layer adjacent the punched-out apertures in the paper strip forming apertures of larger size therein but not punching through the first-mentioned paper strip whereby a heat-pressure-sensitive frame about the punched-out paper strip apertures is formed, registering the material being cut from the adhesive-coated strip by apertures in the first-mentioned paper strip and finally chopping the individual mounts transversely of the paper strip material while registering the chopping operation by the punched-out apertures in the paper strip.

12. The method defined in claim 11 characterized in that the pairs of apertures punched out in the first-mentioned paper strip are of different size so that the apertures may have edges lying in offset positions one with respect to the other when the paper strip is folded and the edges of the apertures may lie out of exact registration, and characterized in that the intermittent movement is accomplished by utilizing the edges of one of the dissimilar apertures only, the smaller of the two apertures forming the sole picture-framing element of the mount while the larger of the apertures may hold a transparency thereagainst.

References Cited in the file of this patent

UNITED STATES PATENTS 2,033,736     Perryman _____ Mar. 10, 1936